(12) United States Patent
Delaporte

(10) Patent No.: US 12,332,696 B2
(45) Date of Patent: Jun. 17, 2025

(54) APERTURE MECHANISM FOR SUPPORTING AN INVERTIBLE FLEXIBLE DISPLAY

(71) Applicant: Lepton Computing LLC, Brooklyn, NY (US)

(72) Inventor: Stephen E. Delaporte, New York, NY (US)

(73) Assignee: Lepton Computing LLC, Brooklyn, NY (US)

( * ) Notice: Subject to any disclaimer, the term of this patent is extended or adjusted under 35 U.S.C. 154(b) by 0 days.

(21) Appl. No.: 18/539,441

(22) Filed: Dec. 14, 2023

(65) Prior Publication Data
US 2024/0111336 A1 Apr. 4, 2024

Related U.S. Application Data

(63) Continuation of application No. 17/846,517, filed on Jun. 22, 2022, now Pat. No. 11,880,242.

(60) Provisional application No. 63/213,585, filed on Jun. 22, 2021.

(51) Int. Cl.
*G06F 3/041* (2006.01)
*G06F 1/16* (2006.01)

(52) U.S. Cl.
CPC ............ *G06F 1/1652* (2013.01); *G06F 3/041* (2013.01); *G06F 2203/04102* (2013.01)

(58) Field of Classification Search
CPC .... G06F 1/1616; G06F 1/1641; G06F 1/1652; G06F 1/1681; G06F 3/041; G06F 2203/04102; G09F 9/301; G09G 2308/02
See application file for complete search history.

(56) References Cited

U.S. PATENT DOCUMENTS

| | | | | |
|---|---|---|---|---|
| 10,368,452 B2* | 7/2019 | Yun | ....................... | G06F 1/1681 |
| 11,181,947 B2* | 11/2021 | de la Fuente | ....... | H04M 1/0237 |
| 11,217,124 B2* | 1/2022 | Feng | ....................... | G09F 9/335 |
| 11,315,443 B2* | 4/2022 | Han | ....................... | G06F 1/1624 |
| 11,474,561 B2* | 10/2022 | Kim | ....................... | G06F 1/1656 |
| 11,567,614 B2* | 1/2023 | Kishimoto | .......... | G06F 3/03545 |
| 11,880,242 B2* | 1/2024 | Delaporte | ............. | G06F 1/1616 |

(Continued)

*Primary Examiner* — Joe H Cheng
(74) *Attorney, Agent, or Firm* — Shore IP Group, PLLC; Sean R. Wilsusen

(57) ABSTRACT

A foldable touch screen display device made up of flexible segments that can be folded from a compact state to an expanded state which also includes an aperture that can retract parallel to the respective planes of each flexible display segment structure. The form factor of the compact state is roughly the size of a typical handheld phone or smaller. The form factor of the expanded state is roughly the size of a larger phone or tablet computer, which may also have the size and mechanical functionality of a laptop. The device may also have a flip phone configuration. Both folded states may include an integrated speaker and microphone. The device may also be folded 360 degrees about a hinge such that it can fold to a compact folded state in one direction with its flexible display segments facing inward towards each other, or to an inverted compact folded state in the opposite direction such that the flexible display segments are facing outward along the device's segment structures. The aperture acts as a central support for the flexible display that can also retract as the device is folded to any state such that the display is not damaged.

14 Claims, 4 Drawing Sheets

(56) References Cited

U.S. PATENT DOCUMENTS

| | | | |
|---|---|---|---|
| 2010/0064244 A1* | 3/2010 | Kilpatrick, II | H04M 1/0243 |
| | | | 345/1.3 |
| 2013/0010405 A1* | 1/2013 | Rothkopf | H05K 5/0017 |
| | | | 361/679.01 |
| 2015/0378397 A1* | 12/2015 | Park | G06F 1/1656 |
| | | | 361/679.27 |
| 2018/0332205 A1* | 11/2018 | Hawthorne | H04N 23/45 |
| 2019/0131553 A1* | 5/2019 | Park | H01L 51/5237 |
| 2019/0174645 A1* | 6/2019 | Jeon | G06F 1/1681 |
| 2020/0166974 A1* | 5/2020 | Ai | G06F 1/1641 |
| 2021/0011514 A1* | 1/2021 | Wang | G06F 1/1618 |
| 2021/0366318 A1* | 11/2021 | Feng | G06F 1/1652 |
| 2021/0397226 A1* | 12/2021 | Siddiqui | G06F 1/1652 |
| 2022/0103670 A1* | 3/2022 | Liao | G06F 1/1652 |
| 2022/0197341 A1* | 6/2022 | Delaporte | G06F 1/1679 |
| 2022/0197342 A1* | 6/2022 | Delaporte | G06F 1/1616 |
| 2022/0311848 A1* | 9/2022 | Delaporte | H04M 1/0268 |

* cited by examiner

APERTURE MECHANISM FOR SUPPORTING AN INVERTIBLE FLEXIBLE DISPLAY

CROSS REFERENCE TO RELATED APPLICATIONS

This application is a continuation of U.S. patent application Ser. No. 17/846,517, filed on Jun. 22, 2022, entitled "INVERTIBLE FLEXIBLE DISPLAY DEVICE WITH A PARALLEL RETRACTION APERTURE", now U.S. Pat. No. 11,880,242, which claims priority to and the benefit of U.S. Provisional Patent Application No. 63/213,585, filed on Jun. 22, 2021, which are incorporated in their entirety herein by reference.

TECHNICAL FIELD

The present invention relates generally to computing devices, and more particularly, to a computing device with a touch screen display that can be folded from a compact state to an expanded state.

BACKGROUND

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic-intensive applications, and reading text. The rigid nature of a standard touch screen display can also limit the portability of a device when its form factor is in the larger size range for a phone, or at the scale of a tablet, which makes folding a desirable feature. Additionally, because of a flexible display's capacity to fold in one direction to a closed folded state, and then in the opposite direction to an open folded state, it would be advantageous to have a device mechanism that can support both of these folded states in addition to an unfolded expanded state.

There is therefore a need for touch screen display devices that can be adjusted in size without sacrificing the convenience of being compact or handheld. There is also a need for aperture mechanisms that can act as a structural support for the flexible display when the device is in an unfolded expanded state which can also retract so as not to damage the display.

SUMMARY

According to one aspect, an apparatus is provided. The apparatus includes a flexible touch-sensitive display composed of a first flexible touch-sensitive display portion and a second flexible touch-sensitive display portion; wherein: (1) the first flexible touch-sensitive display portion is attached to a first structural support segment; (2) the second flexible touch-sensitive display portion is attached to a second structural support segment; (3) the flexible touch-sensitive display further comprises having a fully folded state such that both flexible touch-sensitive display portions are facing inward towards each other; (5) the flexible touch-sensitive display further comprises having a fully expanded state such that both flexible touch-sensitive display portions are in a continuous open position along the same plane; and (6) the flexible touch-sensitive display further comprises having an inverted fully folded state such that both flexible touch-sensitive display portions are facing outward relative to each other. An aperture support mechanism is configured and attached to at least one flexible touch-sensitive display structural support segment such that as the apparatus is folded, the folding motion of the apparatus activates the sliding motion of the aperture support.

In some exemplary embodiments, a first aperture support is connected to the first flexible touch-sensitive display structural support segment and a second aperture support is connected to the second flexible touch-sensitive structural support segment.

In some exemplary embodiments, the first structural support segment and the second structural support segment are connected by a hinge and a sleeve structure that houses the hinge.

In some exemplary embodiments, the aperture support includes slats and the touch-sensitive display structural support segment includes grooves such that the slats of the aperture support can slide within the grooves of the touch-sensitive display structural support segment.

In some exemplary embodiments, the aperture support includes grooves and the touch-sensitive display structural support segment includes slats such that the slats of the touch-sensitive display structural support segment can slide within the grooves of the aperture support.

In some exemplary embodiments, the aperture support mechanism includes a link.

In some exemplary embodiments, the aperture support is mechanically connected to a pivot point on a first end of the link and the hinge sleeve structure is mechanically connected to a pivot point on a second end of the link.

In some exemplary embodiments, the aperture support mechanism includes a first link and a first aperture support and a second link and a second aperture support.

In some exemplary embodiments, the first aperture support is mechanically connected to a pivot point of the first end of the first link and the second aperture support is mechanically connected to a pivot point of the first end of the second link.

In some exemplary embodiments, the second end of the first link and the second end of the second link are mechanically connected to the same pivot point on the hinge sleeve structure support.

According to another aspect, an apparatus is provided. The apparatus includes a rigid touch-sensitive display and a flexible touch-sensitive display composed of a first flexible touch-sensitive display portion and a second flexible touch-sensitive display portion; wherein: (1) the first flexible touch-sensitive display portion is attached to a first structural support segment; (2) the second flexible touch-sensitive display portion is attached to a second structural support segment; (3) the flexible touch-sensitive display further comprises having a fully folded state such that both flexible touch-sensitive display portions are facing inward towards each other: (5) the flexible touch-sensitive display further comprises having a fully expanded state such that both flexible touch-sensitive display portions are in a continuous open position along the same plane; and the flexible touch-sensitive display further comprises having an inverted fully folded state such that both flexible touch-sensitive display portions are facing outward relative to each other. An aperture support mechanism is configured and attached to at least one flexible touch-sensitive display structural support segment such that as the apparatus is folded, the folding motion of the apparatus activates the sliding motion of the aperture support.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1A:
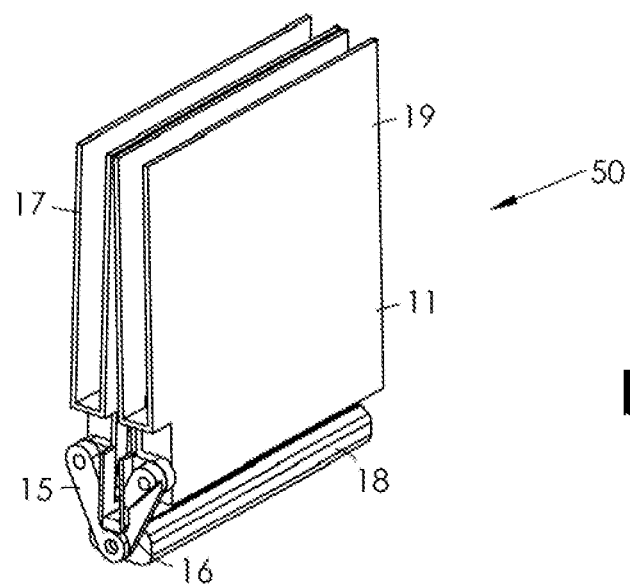
FIGS. 1A-1C are perspective views of a folding sequence for a flexible display computing device and its retractable aperture support mechanism shown in three separate positions transitioning from a folded closed state to an unfolded open state, according to some exemplary embodiments.

In the following detailed description, numerous specific details are set forth in order to provide a thorough understanding of the present technology. However, it will be understood by those skilled in the art that the present technology may be practiced without these specific details. In other instances, well-known methods, procedures, and components have not been described in detail so as not to obscure the present technology.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present technology is directed to a foldable touch screen display device made up of flexible segments that can be folded from a compact state to an expanded state which also includes an aperture that can retract parallel to the respective planes of each flexible display segment structure. The form factor of the compact state is roughly the size of a typical handheld phone or smaller. The form factor of the expanded state is roughly the size of a larger phone or tablet computer, which may also have the size and mechanical functionality of a laptop. The device may also have a flip phone configuration. Both folded states may include an integrated speaker and microphone. The device may also be folded 360 degrees about a hinge such that it can fold to a compact folded state in one direction with its flexible display segments facing inward towards each other, or to an inverted compact folded state in the opposite direction such that the flexible display segments are facing outward along the device's segment structures. The aperture acts as a central support for the flexible display that can also retract as the device is folded to any state such that the display is not damaged. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

Figure 1B:
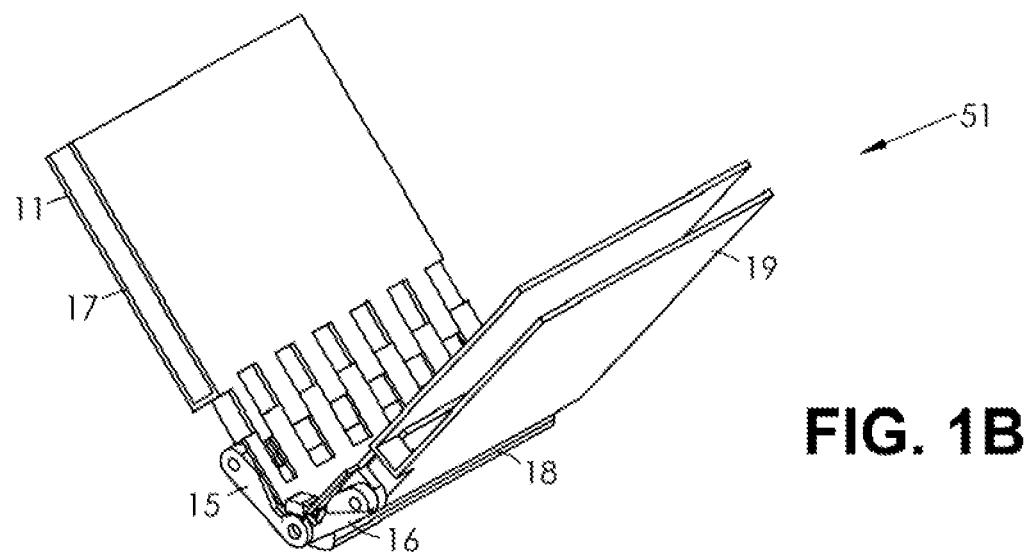
Figure 1C:
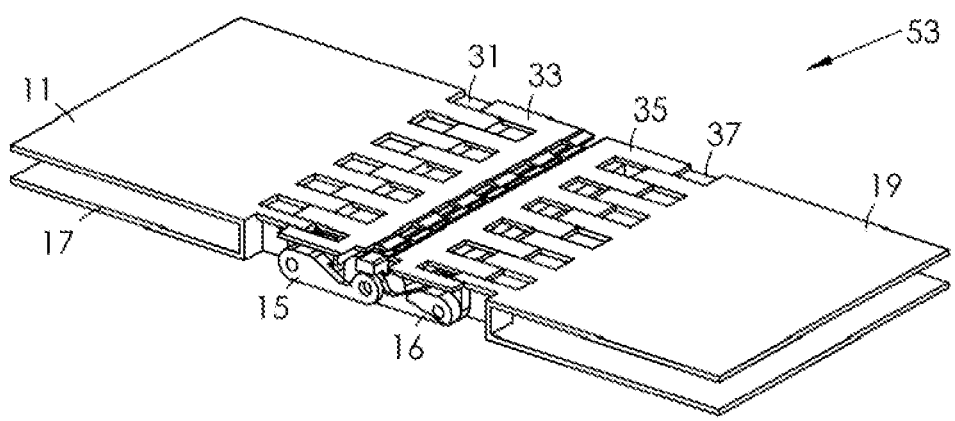

In accordance with the exemplary embodiment shown in FIGS. 1A-1C, a foldable display computing device 11 having two display segment structural supports 17 and 19 that fold about hinge 18, is shown in three separate positions 50, 51, and 53. The first position 50 shows the two display segment structural supports 17 and 19 in a closed state whereby an attached flexible display would sit with its segments facing each other which is further illustrated in FIGS. 4A-4F, where flexible display 70 is shown integrated with foldable display computing device 11 in position 50. Links 15 and 16 are shown having a shared pivot point located at the center of the device's hinge 18 while their opposite pivot points are attached to pins or holes located on each of their respective aperture supports 33 and 35. The aperture supports 33 and 35 can slide parallel along the plane of each of their respective display segment structural supports 17 and 19 within an array of slat grooves 31 and 37 such that they can retract as the device is folded. This retraction occurs because the pivot points of links 15 and 16 are located at the center which is offset from the pivot point of display segment structural supports 17 and 19, which forces links 15 and 16 to move aperture supports 33 and 35 to a retracted position due to the differential in rotational motion. The retraction is less crucial in the folding sequence shown in FIGS. 1A-1C, as it only needs to provide a small amount of clearance for the aperture supports 15 and 16 such that they do not interfere with hinge 18. Hinge 18 also has a channel down its center so aperture supports 15 and 16 can be folded inward towards the center of hinge 18 without needing greater retraction clearance. This cavity also provides a place where flexible display 70 and its fold radius can sit as shown in the corresponding sectional diagram from FIGS. 4A-4F. Positions 51 and 53 show foldable display computing device 11 being unfolded to an open state which is also further illustrated with flexible display 70 integrated in a flat open position in FIGS. 4A-4F.

Figure 2A:
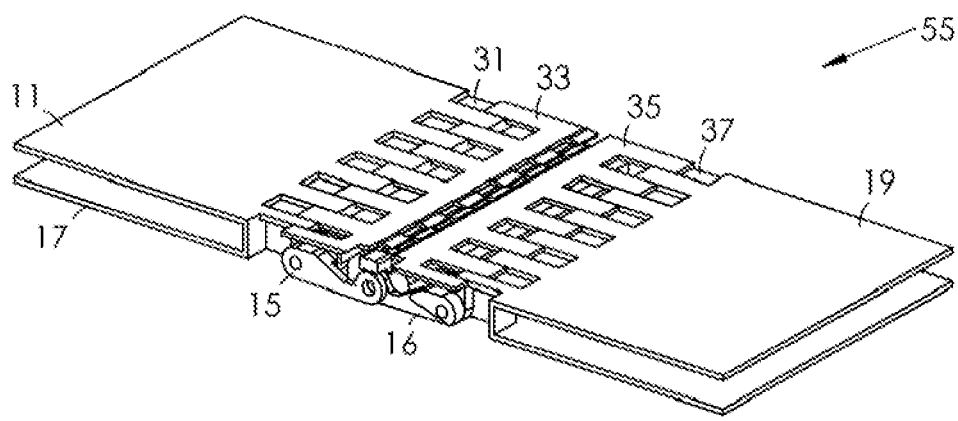
FIGS. 2A-2C are perspective views of a folding sequence for a flexible display computing device and its retractable aperture support mechanism shown in three separate positions transitioning from an unfolded open state to a folded open state, according to some exemplary embodiments.
Figure 2B:
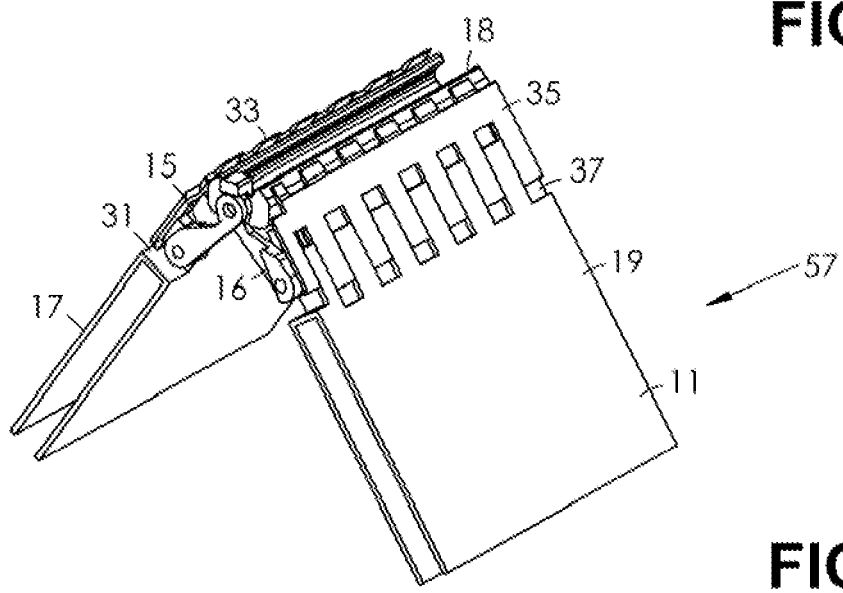
Figure 2C:
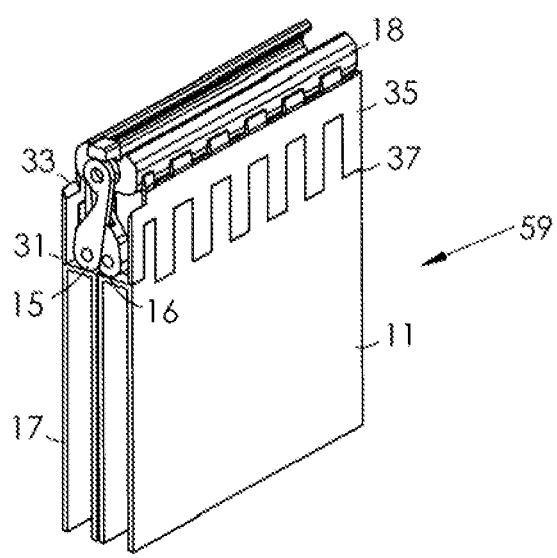

FIGS. 2A-2C are perspective views of foldable display computing device 11 with a similar folding sequence as shown from FIGS. 1A-1C, but in the case of FIGS. 2A-2C, flexible display segment structural supports 17 and 19 are shown being folded in the opposite direction such that the device ends up in an inverted folded state which is shown in position 59, as compared with the folded state shown in position 50. The inverted folded state shown in position 59 also corresponds with position 59 in FIGS. 4A-4F where flexible display 70 can be seen with its flexible display segments facing outward and the flexible display central portion 71 of flexible display 70 can be seen wrapped around the edges of hinge 18 and the retracted aperture supports 33 and 35. Similar to position 53 shown in FIGS. 1A-1C, position 55 is FIGS. 2A-2C also shows the section of foldable mobile device in an unfolded open state which corresponds to position 55 in FIGS. 4A-4F, where flexible display 70 is shown facing upward in an open state. It is important to note that the aperture supports 33 and 35 provide a structural support at the center of flexible display 70 such that it does not deflect inward within the hinge 18, otherwise flexible display 70 will be damaged. The main disadvantage to having fixed structural supports that extend and span across the center of the device between display segments is that when they are folded, they will damage the flexible display as long as it is fixed along display segment structural supports 17 and 19. To overcome this, the retraction feature allows the aperture supports 33 and 35 to move to a position that will not pull or pierce the flexible display center portion 71 which is illustrated in FIGS. 4A-4F with positions 57 and 59, as it shows how aperture supports 33 and 35 move downward away from the center of the device while also moving below flexible display 70 but above and parallel to each aperture support's respective display segment structural supports 17 and 19. It is important to note that slats are also shown integrated with aperture supports 33 and 35 that move with slat grooves 31 and 37. Additional slats are also included on the center side of aperture supports 33 and 35 such that they can extend to the midpoint of the device down the center of hinge 18 and also not collide with each other when the device is folded to a closed state as shown in position 50 in FIGS. 1A-1C and FIGS. 4A-4F. While the slats provide one approach to the sliding parallel retraction of aperture supports 33 and 35, an alternative approach could be implemented where the aperture supports 33 and 35 are one contiguous support structure that shifts and slides below the respective top wall of segment structural supports 17 and 19. This would eliminate the need for slats and the need for it to move in a motion parallel to the top surface of the device, but the implementation of the basic linkage drive mechanism as shown with links 15 and 16 would remain the same to provide a similar kind of displacement motion. It should also be noted that the retractable aperture support can be used with a device that only folds into one of the two folded states described in this patent instead of both states within a single device.

Figure 3:
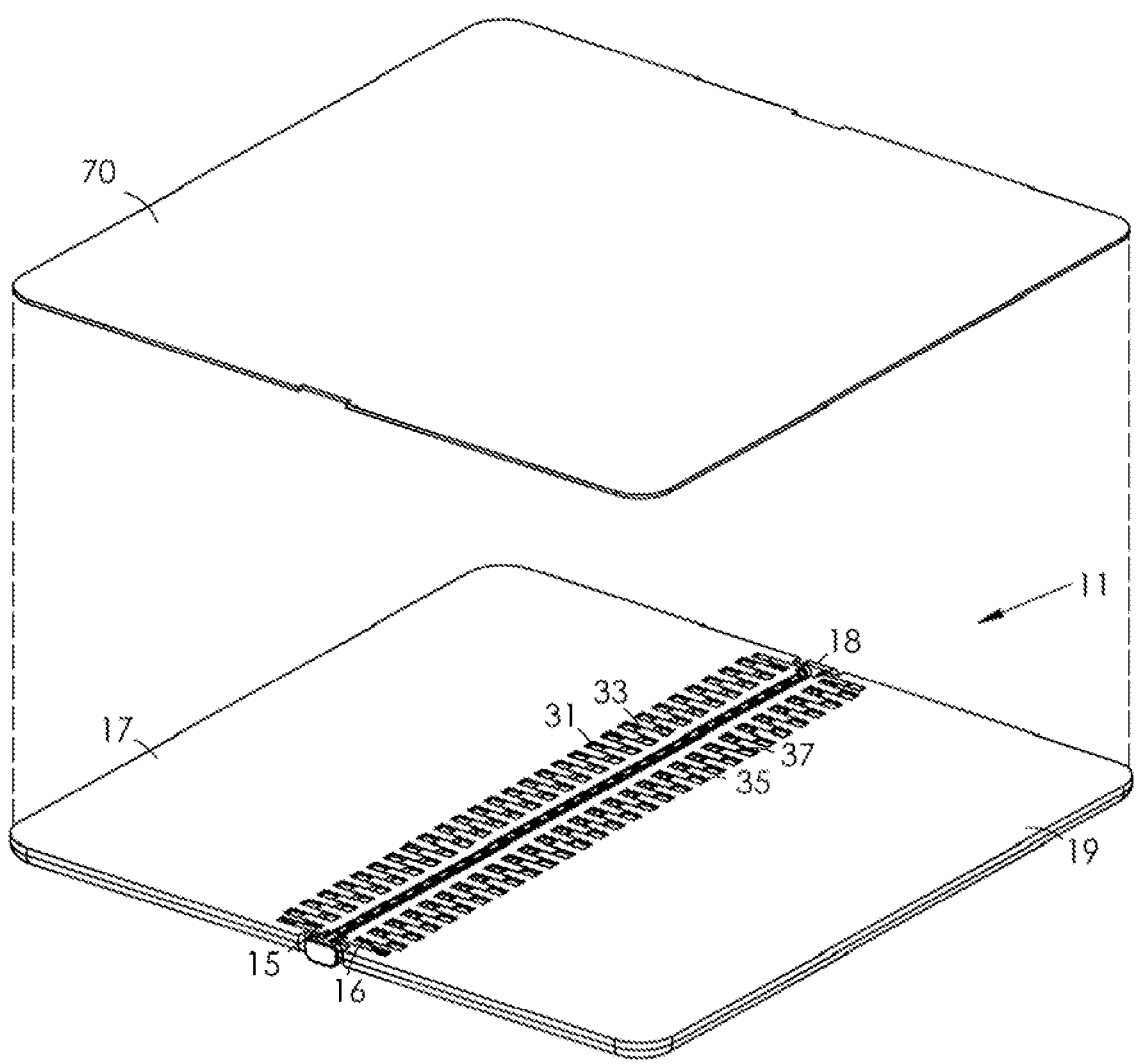
FIG. 3 is an exploded perspective view of a flexible display computing device with its flexible display shown above and the device's main assembly which also highlight the centrally located retractable aperture support mechanism, according to some exemplary embodiments.
Figure 4A:
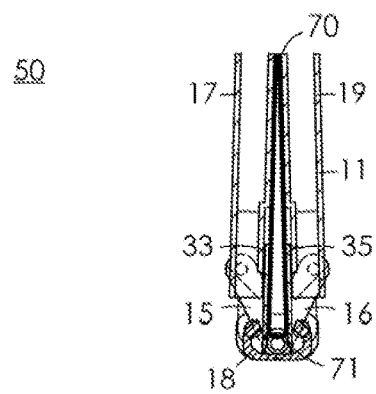
FIGS. 4A-4F are perspective views of a folding sequence for a flexible display computing device and its retractable aperture support mechanism shown in six separate positions transitioning from a folded closed state to an unfolded state, and then to an inverted folded open state, according to some exemplary embodiments.
Figure 4B:
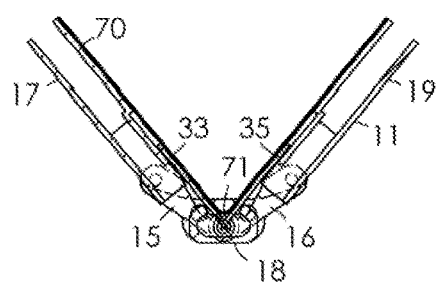
Figure 4C:
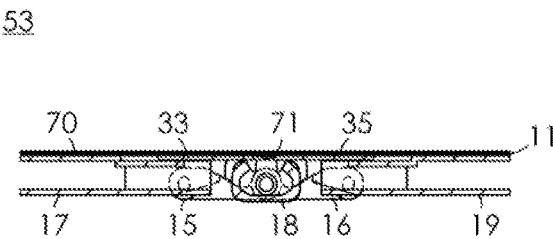
Figure 4D:
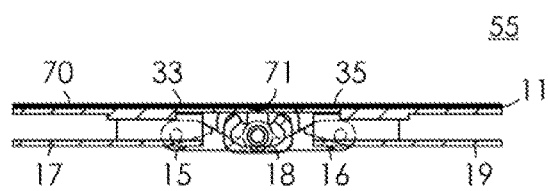
Figure 4E:
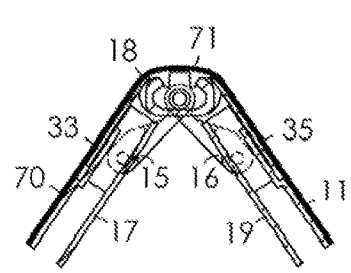
Figure 4F:
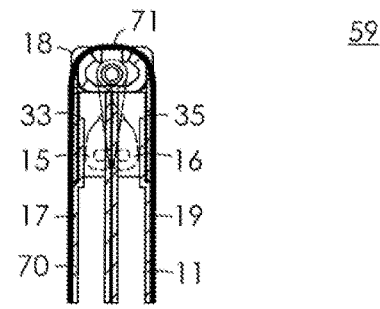

FIG. 3 shows an exploded perspective view of flexible display computing device 11 with its flexible display 70 shown above and the device's main assembly which also highlights how retractable aperture supports 33 and 35 are located down the center of the foldable display computing device 11 between display segment structural supports 17 and 19. It is also important to note that while the embodiments show a single flexible display with two display segments, a rigid cover display may also be included with the device. The device may also have different display aspect ratios such that it takes on the flip phone form factor.

While certain features of the invention have been illustrated and described herein, many modifications, substitutions, changes, and equivalents will now occur to those of ordinary skill in the art. It is, therefore, to be understood that the appended claims are intended to cover all such modifications and changes that fall within the true spirit of the invention.

The invention claimed is:
1. An apparatus comprising:
(a) a flexible touch-sensitive display composed of a first flexible touch-sensitive display portion and a second flexible touch-sensitive display portion; wherein:
(1) the first flexible touch-sensitive display portion is attached to a top surface of a first structural support segment, whereby the top surface has a first edge situated in close proximity to where the first flexible touch-sensitive display portion meets the second flexible touch-sensitive display portion, and the top surface has a second edge situated on the opposite parallel side of the first edge of the first structural support segment;
(2) the second flexible touch-sensitive display portion is attached to a top surface of a second structural support segment, whereby the top surface has a first edge situated in close proximity to where the first flexible touch-sensitive display portion meets the second flexible touch-sensitive display portion, and the top surface has a second edge situated on the opposite parallel side of the first edge of the second structural support segment;
(3) the flexible touch-sensitive display further comprises a fully folded state such that both flexible touch-sensitive display portions are facing inward towards each other;
(5) the flexible touch-sensitive display further comprises a fully expanded state such that both flexible touch-sensitive display portions are in a continuous open position along the same plane;
(6) the flexible touch-sensitive display further comprises an inverted fully folded state such that both flexible touch-sensitive display portions are facing outward relative to each other; and
(b) a hinge having at least two pivot points, wherein a first pivot point is located approximately on a first end of the side of the hinge such that it is mechanically attached to the first structural support segment, a second pivot point is located approximately on a second end of the side of the hinge such that it is mechanically attached to the second structural support segment;
(c) an aperture support mechanism configured with at least one aperture support having a top surface such that the top surface of the at least one aperture support is parallel and approximately tangent with the same plane as the top surface of the first structural support segment, whereby the at least one aperture support has a first edge that is located approximately between the first edge of the first structural support segment and the first edge of the second structural support segment when the apparatus is in the fully expanded state, and the at least one aperture support has a second edge on the opposite parallel side of the first edge the at least one aperture support that is located approximately between the first edge and the second edge of the first structural support segment when the apparatus is in the fully expanded state; whereby when the apparatus is in the inverted fully folded state, the first edge of the at least one aperture support is relocated to a position that is closer in proximity to the first edge of the first structural support segment, and the second edge of the at least one aperture support is relocated to a position that is in closer proximity to the second edge of the first structural support segment.

2. The apparatus of claim 1 wherein:
the hinge is connected to a sleeve structure that spans between the first structural support segment and the second structural support segment.

3. The apparatus of claim 2 wherein:
the top surface of the sleeve structure has a curvilinear geometry in cross section such that the flexible touch-sensitive display can wrap around the top surface of the sleeve structure when the apparatus is in the inverted fully folded state.

4. The apparatus of claim 2 wherein:
the sleeve structure has a cavity going down its center in cross section such that the fold radius of the flexible touch-sensitive display can sit within the cavity of the sleeve structure when the apparatus is in the fully folded state.

5. The apparatus of claim 1 wherein:
the at least one aperture support includes at least one slat and the first structural support segment includes at least one groove such that the at least one slat of the at least one aperture support can slide within the at least one groove of the first structural support segment.

6. The apparatus of claim 1 wherein:
the at least one aperture support includes at least one groove and the first structural support segment includes at least one slat such that the at least one slat of the first structural support segment can slide within the at least one groove of the at least one aperture support.

7. The apparatus of claim 1 wherein:
the hinge includes at least one additional pivot point and the at least one aperture support includes a link having a first end and a second end whereby the first end is mechanically attached to the at least one aperture support and the second end is mechanically attached to the at least one additional pivot point of the hinge.

8. An apparatus comprising:
(a) a flexible touch-sensitive display composed of a first flexible touch-sensitive display portion and a second flexible touch-sensitive display portion; wherein:
  (1) the first flexible touch-sensitive display portion is attached to a top surface of a first structural support segment, whereby the top surface has a first edge situated in close proximity to where the first flexible touch-sensitive display portion meets the second flexible touch-sensitive display portion, and the top surface has a second edge situated on the opposite parallel side of the first edge of the first structural support segment;
  (2) the second flexible touch-sensitive display portion is attached to a top surface of a second structural support segment, whereby the top surface has a first edge situated in close proximity to where the first flexible touch-sensitive display portion meets the second flexible touch-sensitive display portion, and the top surface has a second edge situated on the opposite parallel side of the first edge of the second structural support segment;
  (3) the flexible touch-sensitive display further comprises a fully folded state such that both flexible touch-sensitive display portions are facing inward towards each other;
  (5) the flexible touch-sensitive display further comprises a fully expanded state such that both flexible touch-sensitive display portions are in a continuous open position along the same plane;
  (6) the flexible touch-sensitive display further comprises an inverted fully folded state such that both flexible touch-sensitive display portions are facing outward relative to each other; and
(b) a hinge having at least two pivot points, wherein a first pivot point is located approximately on a first end of the side of the hinge such that it is mechanically attached to the first structural support segment, a second pivot point is located approximately on a second end of the side of the hinge such that it is mechanically attached to the second structural support segment;
(c) an aperture support mechanism configured with at least one aperture support having a top surface such that the top surface of the at least one aperture support is parallel and approximately tangent with the same plane as the top surface of the second structural support segment, whereby the at least one aperture support has a first edge that is located approximately between the first edge of the second structural support segment and the first edge of the first structural support segment when the apparatus is in the fully expanded state, and the at least one aperture support has a second edge on the opposite parallel side of the first edge of the at least one aperture support that is located approximately between the first edge and the second edge of the second structural support segment when the the apparatus is in the fully expanded state; whereby when the apparatus is in the inverted fully folded state, the first edge of the at least one aperture support is relocated to a position that is closer in proximity to the first edge of the second structural support segment, and the second edge of the at least one aperture support is relocated to a position that is closer in proximity to the second edge of the second structural support segment.

9. The apparatus of claim 8 wherein:
the hinge is connected to a sleeve structure that spans between the first structural support segment and the second structural support segment.

10. The apparatus of claim 9 wherein:
the top surface of the sleeve structure has a curvilinear geometry in cross section such that the flexible touch-sensitive display can wrap around the top surface of the sleeve structure when the apparatus is in the inverted fully folded state.

11. The apparatus of claim 9 wherein:
the sleeve structure has a cavity going down its center in cross section such that the fold radius of the flexible touch-sensitive display can sit within the cavity of the sleeve structure when the apparatus is in the fully folded state.

12. The apparatus of claim 8 wherein:
the at least one aperture support includes at least one slat and the second structural support segment includes at least one groove such that the at least one slat of the at least one aperture support can slide within the at least one groove of the second structural support segment.

13. The apparatus of claim 8 wherein:

the at least one aperture support includes at least one groove and the second structural support segment includes at least one slat such that the at least one slat of the second structural support segment can slide within the at least one groove of the at least one aperture support.

14. The apparatus of claim 8 wherein:

the hinge includes at least one additional pivot point and the at least one aperture support includes a link having a first end and a second end whereby the first end is mechanically attached to the at least one aperture support and the second end is mechanically attached to the at least one additional pivot point of the hinge.

\* \* \* \* \*